US008677417B2

(12) United States Patent
Calvert (10) Patent No.: US 8,677,417 B2
(45) Date of Patent: Mar. 18, 2014

(54) METHOD AND APPARATUS FOR ACQUIRING MEDIA SERVICES AVAILABLE FROM CONTENT AGGREGATORS (75) Inventor: Kerry Wayne Calvert, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2752 days.

(21) Appl. No.: 10/250,640

(22) PCT Filed: Jan. 4, 2002

(86) PCT No.: PCT/US02/00008
§ 371 (c)(1), (2), (4) Date: Jul. 3, 2003

(87) PCT Pub. No.: WO02/054769
PCT Pub. Date: Jul. 11, 2002

(65) Prior Publication Data
US 2004/0078812 A1 Apr. 22, 2004

Related U.S. Application Data (60) Provisional application No. 60/259,713, filed on Jan. 4, 2001.

(51) Int. Cl.
H04N 5/445 (2011.01)
G06F 3/00 (2006.01)
G06F 13/00 (2006.01)

(52) U.S. Cl.
USPC .............................................. 725/49; 725/48

(58) Field of Classification Search
USPC .................................................... 725/48–49
See application file for complete search history.

(56) References Cited

U.S. PATENT DOCUMENTS

| 5,557,541 | A | 9/1996 | Schulhof et al. ............... 364/514 |
| 5,636,276 | A | 6/1997 | Brugger ............................ 380/4 |
| 5,655,130 | A | 8/1997 | Dodge et al. ................... 395/772 |
| 5,808,694 | A | 9/1998 | Usui et al. |

(Continued)

FOREIGN PATENT DOCUMENTS

| CN | 1276127 A | 12/2000 |
| EP | 0 834 798 A2 | 4/1998 |

(Continued)

OTHER PUBLICATIONS

"X-ray specs", Cover Feature: Embedded Linux, Linux User—Oct. 2000, 4 pages.

(Continued)

Primary Examiner — Nasser Goodarzi
Assistant Examiner — Fred Peng
(74) Attorney, Agent, or Firm — Robert D. Shedd; Vincent E. Duffy; James McKenzie (57) ABSTRACT A method for generating a unified list of media services available from a plurality of content aggregators having different data formats. A first list of media services from a first content aggregator is transmitted to a playback device. A second list of media services from a second content aggregator is also transmitted to the playback device, which combines both lists into a unified list of media services. The method optionally details the playback of a media service from said plurality of content aggregators via a selection made on the unified list to a playback device.

15 Claims, 10 Drawing Sheets

(56) References Cited

U.S. PATENT DOCUMENTS

| | | | |
|---|---|---|---|
| 5,923,362 A | 7/1999 | Klosterman | 348/12 |
| 5,990,883 A | 11/1999 | Burne et al. | |
| 6,075,570 A * | 6/2000 | Usui et al. | 725/49 |
| 6,157,411 A * | 12/2000 | Williams et al. | 348/552 |
| 6,230,205 B1 | 5/2001 | Garrity et al. | 709/231 |
| 6,332,175 B1 | 12/2001 | Birrell et al. | 711/112 |
| 6,367,019 B1 | 4/2002 | Ansell et al. | 713/201 |
| 6,600,503 B2 * | 7/2003 | Stautner et al. | 715/854 |
| 6,904,609 B1 * | 6/2005 | Pietraszak et al. | 725/39 |
| 2004/0172658 A1 * | 9/2004 | Rakib et al. | 725/120 |
| 2004/0199932 A1 * | 10/2004 | Gottfurcht et al. | 725/52 |

FOREIGN PATENT DOCUMENTS

| | | | |
|---|---|---|---|
| JP | 2000004272 | 1/2000 | |
| JP | 2000231528 | 8/2000 | |
| JP | 2000253367 | 11/2007 | |
| WO | 9920049 A1 | 4/1999 | |
| WO | WO 99/35849 A1 | 7/1999 | |
| WO | 99/60766 | 11/1999 | H04M 3/50 |
| WO | 9956207 | 11/1999 | |
| WO | 0056066 A1 | 9/2000 | |
| WO | WO 00/56066 A1 | 9/2000 | |
| WO | 01/17142 | 3/2001 | |
| WO | 01/28222 | 4/2001 | |

OTHER PUBLICATIONS

"*Universal Plug and Play Device Architecture*", Version 1.0, Jun. 8, 2000, © 1999-2000 Microsoft Corporation, http://www.upnp.org/download/UPnPDA10_20000613.htm, 53 pages.

Tim Berners-Lee, "*Universal Resource Identifiers in WWW*", http://www.w3.org/Addressing/URL/uri-spec.html, Geneva, Switzerland, 23 pages.

Bray,et al. Extensible Markup Language (XML) 1.0 (Second Edition) W3C Recommendation Oct. 6, 2000, Internet citation ,http://www.w3.org/TR/REC-xml.

\* cited by examiner

```xml
<?xml version ="1.0"?>
<!--MEDIAMATCH_CONTENT_LIST-->
<!DOCTYPE list [
    <!ELEMENT mediaservice (location, media_title, player_app, performer, genre, copyright)>
    <!ELEMENT location (#PCDATA)>
    <!ELEMENT media_title (#PCDATA)>
    <!ELEMENT player_app (#PCDATA)>
    <!ELEMENT performer (#PCDATA)>
    <!ELEMENT genre (#PCDATA)>
    <!ELEMENT copyright (#PCDATA)>
]>
<list>

<mediaservice>
    <location>http://www.musictesters.com/buggy/travoltaswing.MP3</location>
        <media_title>TravoltaSwing</media_title>
        <player_app>MP3</player_app>
        <performer>Travolta_John</performer>
        <genre>Bluegrass</genre>
        <copyright>1989</copyright>
    </mediaservice>

<mediaservice>
        <location>121.12.113.331</location>
        <media_title>The_Big_Sleep</media_title>
        <player_app>MPEG_4</player_app>
        <performer>Bogart_Humphrey</performer>
        <genre>Mystery</genre>
        <copyright>1946</copyright>
    </mediaservice>

<mediaservice>
        <location>111.345.44.332</location>
        <media_title>Steve_Dahl</media_title>
        <player_app>RealAudio</player_app>
        <performer>Dahl_Steve</performer>
        <genre>Talk_SHow</genre>
        <copyright>2001</copyright>
    </mediaservice>
</list>
```

FIG. 9

| GENRE | TITLE | PERFORMER | MEDIA FORMAT | LOCATION |
|---|---|---|---|---|
| BLUEGRASS | TRAVOLTA SWING | JOHN TRAVOLTA | MUSIC SONG | www.musictesters.com/buggy/travoltaswing.MP3 |
| MYSTERY | THE BIG SLEEP | HUMPHREY BOGART | MOVIE | 121.12.133.331 |
| TALK SHOW | STEVE DAHL | STEVE DAHL | STREAMING AUDIO | 111.345.44.332 |

METHOD AND APPARATUS FOR ACQUIRING MEDIA SERVICES AVAILABLE FROM CONTENT AGGREGATORS

This application claims the benefit under 35 U.S.C. §365 of International Application PCT/US02/00008 filed Jan. 4, 2002, which claims the benefit of U. S. Provisional Application 60/259,173 filed Jan. 4, 2001.

This invention is related to the field of indexing, acquiring, and playing media services, particularly media services in the form of streaming media available from a plurality of content aggregators.

Listening to radio broadcast programming, such as music, news, and talk shows, is a commonly enjoyed form of media entertainment that are typically sent as radio transmissions through the airwaves.

Radio transmissions have problems that arise due to the inherent physical limitations of using radio waves. For example, radio waves lose power the further they are from their broadcast source, whereby it becomes difficult for a receiver to reliably receive and demodulate a broadcast from a long distance. This limitation makes it difficult for listeners to receive their favorite stations if outside of a geographic region (e.g., a person who lives in Boston typically can not receive a radio broadcast from Los Angeles). Additionally, the frequencies of radio broadcasts have to be tightly controlled because the airwaves can only accommodate a finite number of electronic-magnetic waves before interference results.

The limitations of broadcasting via radio waves are overcome by using alternative broadcasting techniques. One approach transmits radio station broadcasts as satellite transmissions that are received through a satellite dish coupled to an audio decoder. Satellite broadcasts have a further geographic range than radio wave based transmissions. Also, satellite transmissions can accommodate more radio stations broadcasts than broadcasted as radio waves, by using techniques as multiplexing and data compression increasing the bandwidth efficiency of a transmission. Satellite broadcasts are limited in programming choices available, because the radio stations are selected by satellite broadcasters and broadcasting via satellite is cost prohibitive, which may underrepresent the broadcasting choices available from small media markets.

The amount of programming choices available to a listener (or viewer) has increased since the development of radio and video transmissions through a communications network such as the Internet. Radio and video services (referred to as media services) that were otherwise limited by geographic bandwidth or other constraints are broadcasted around the world via the Internet. Any user who possesses a connection to the Internet and an Internet enabled device (computer, cellular phone, MP3 music player, Internet appliance, satellite receiver) can receive a media service broadcasted in the form of streaming media. The media service is encoded and compressed, typically by a computer, into packets that conform to a transport protocol, such as TCP/IP. The packets are routed to a listener's device through the Internet, in that software on the listener's decoding device (e.g., a computer with a media player as REALPLAYER™, MACROMEDIA PLAYER™, and MP3PRO™) decompresses and decodes the-packets into an audio/video signal for playback on an output device (computer, receiver, stereo, television set).

The Internet provides a listener with the ability to access thousands of media services. The music genres available to a user are equally as expansive, as a user can select to hear a sub-genre of a music genre (e.g., a rock and roll station "music genre" that plays 1980's new wave music "sub-genre"). The listener also can manipulate the songs (media objects) or content heard into a playlist, which is organized by the preferences of the listener. These broadcasts are accessed choosing a link (uniform resource indicator URI) to a music file on a website or by using a media player that receives streaming feeds of media services. Within all of these customizable options, it is difficult for a user to find all of the media services available because the content on the Internet is chaotically organized.

One development for organizing media services available through the Internet is the use of a tuning service or a media subscription service. These type of services (alternatively known as content aggregators), such as MUSICMATCH™, LIVE365™, and STREAMWAVES™ bring together a plurality of media services to a common point or interface (e.g., a website, a streaming media player with channels) with an architecture where a user selects media services from categories including genre and performer. A tuning service is typically proprietary to protect the copyrighted material comprising media services and requires an interface to successfully use the tuning service to playback an available media service. The restrictions of using a proprietary tuning service typically limits a user from activating media services available from different content aggregators, without switching to an additional device.

In accordance with the principles of the present invention, a method and apparatus are disclosed that enable the indexing and acquisition of media services from a plurality of content aggregators. A listing of media services is generated by the indexing of available media services from the plurality of content aggregators. The method and apparatus also describe the retrieval and output of a selected media service available from the plurality of content aggregators to a playback device.

Figure 1:
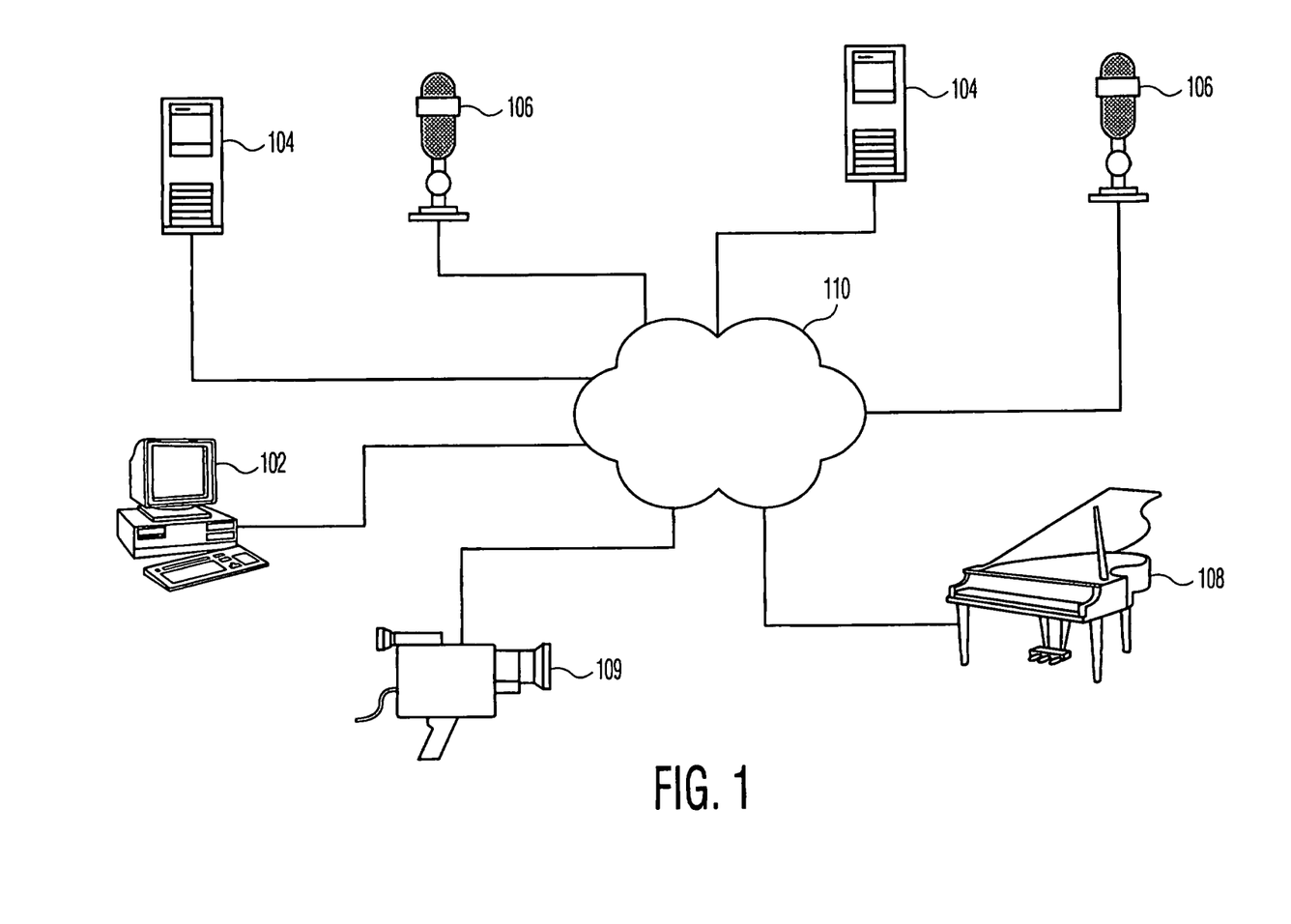
FIG. 1 is a diagram of audio and video based media services that are aggregated by a content aggregator.

In FIG. 1, a composition of media services available to a content aggregator 102 is shown. Audio based media services, as audio website 104, radio station 106, music service 108, originating as audio based feeds (e.g., music, talk radio show, streaming media files, baseball game, audio from a television program, audio books), and video station 109 (e.g., CNN®, ABC®, DIRECTV®) are media services available to content aggregator 102 through communications network 110 (e.g., Internet, Public Switched Telephone Network (PSTN), Local Area Network (LAN), wireless network, Digital Subscriber Line (DSL), peer to peer network). Preferably, the media services are coupled to content aggregator 102 via communications network 110 with the media services transmitted as packets conforming to a TCP/IP protocol. Optionally, content aggregator 102 receives audio and video feeds that are transmitted through a wireless interface (radio frequency, microwaves, infrared) or receives media objects (e.g., audio-video files that are pre-recorded or real time feeds transmitted as streaming media) that are stored locally at the site of the content aggregator 102 (such as in a hard disk drive, optical storage, removable storage device, or magnetic tape).

The media services available for transmission comprise audio and video feeds. Audio website 104 is an Internet based website that comprises audio based media services that are transmitted in the form of streaming media or are computer files partially or completely transmitted. Optionally, the media services may purport to a type of media file format (e.g., REALAUDIO®, REALMEDIA®, APPLE QUICKTIME®, MICROSOFT® WINDOWS MEDIA™ FORMAT, MPEG-2 LAYER III AUDIO, and MP3®) that is played back via a media player (REALPLAYER®, WINAMP®, and MICROSOFT® WINDOWS MEDIA™ PLAYER). Radio station 106 is a content provider that broadcasts radio programs as audio based streamed media services. The broadcasts may be live or prerecorded. Music service 108 is a media service that is subscription based (e.g., MUSAK®, MUSIC CHOICE®) that broadcasts programming as an audio based media service available through the content aggregator 102. Video feed 109 is a media service that is transmitted from a television station (e.g., CNN, ABC) or as a video service (e.g., a movie on demand) available to content aggregator 102.

In accordance with the principles of the present invention, content aggregator 102, in an alternative embodiment, exists as a web resource (e.g., website, index, catalog) that comprises Uniform Resource Indicators (URIs) that link to the location of media services. A playback program (e.g., a streaming media player) directly accesses a media service at its listed location (by using the listed link) instead of receiving the media service directly from content aggregator 102. Content aggregator 102 may comprise an index of links to the location of media services and may have media services that are transmitted directly from content aggregator 102.

Uniform resource indicators (URIs) are a universal set of names that refer to existing protocols or name spaces that identify resources (e.g., website, streaming media server,), services (e.g., videos on demand, internet radio), devices (e.g., mobile phone, internet enable appliance), and data files (e.g., media files and text documents). A URL is a form of a URI that expresses an address that maps to an access algorithm using network protocols (e.g., TCP/IP or a MPEG transport scheme). When a URL is used, a specific resource, service, device, or data file may be accessed and/or manipulated. An alternative form of a URI known as an Internet protocol number or address (IP) is a series of numbers that refers to a specific resource, service, or data file. Optionally, a URL is mapped to an IP number, typically through a Domain Name Server (DNS), that provides two ways to access a desired resource (e.g., a resource is accessed either by using the domain name www.whitehouse.gov or the IP address 198.137.240.91).

Figure 2:
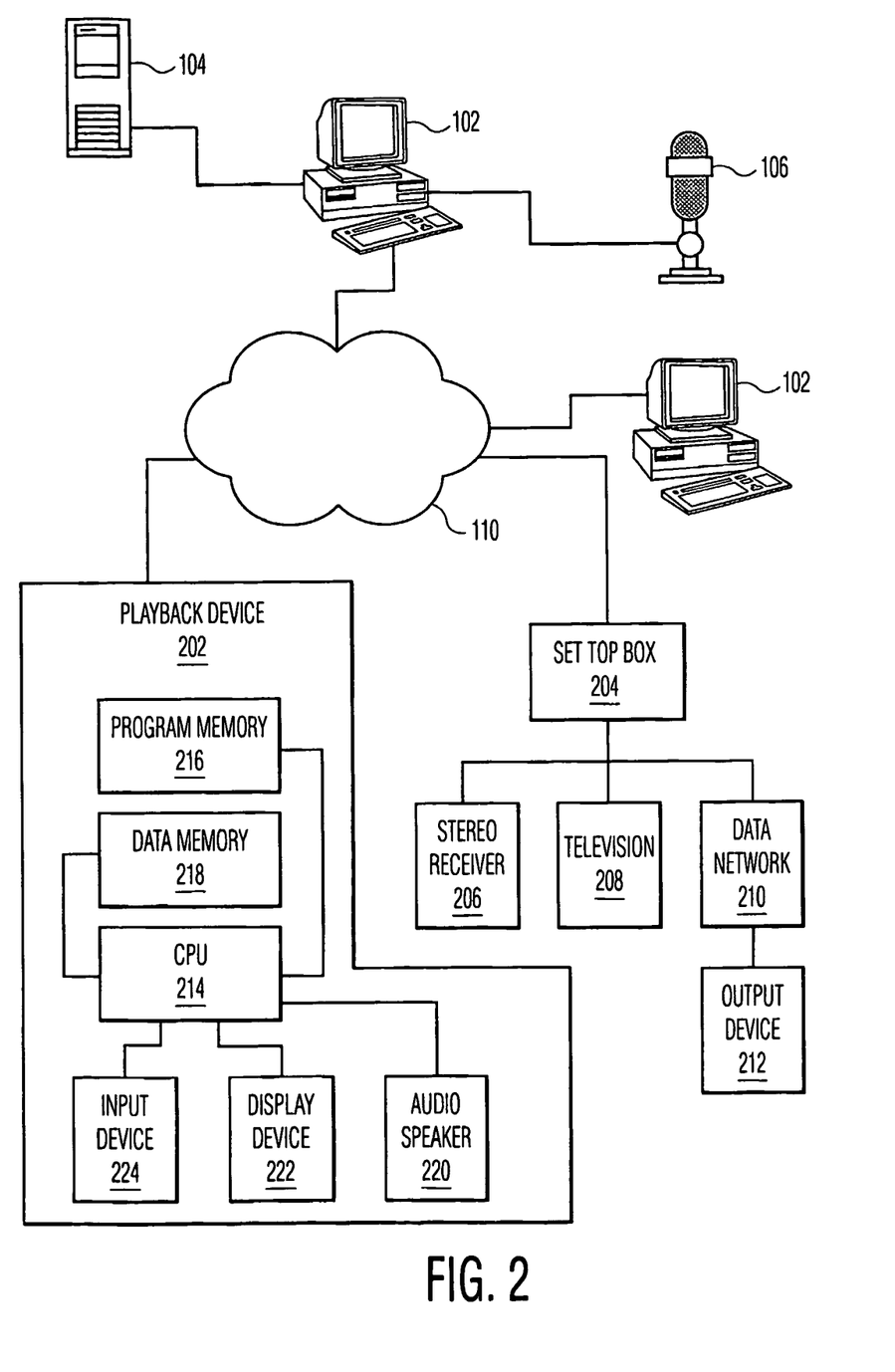
FIG. 2 is a diagram of an Internet connection between devices using the invention and a plurality of content aggregators.

FIG. 2 illustrates a connection between Internet enabled devices (a playback device 202, cable set top box 204, computer, cellular phone, MP3 player, video game system) and a plurality of content aggregators. Content aggregator 102 receives audio based media services from audio website 104 and radio station 106. An Internet enabled device, such as playback device 202, accesses content aggregator 102 via a communications network 110 (e.g., Internet).

Playback device 202 communicates with content aggregator 102 to request a listing of media services available from content aggregator 102 and to receive media services selected from the list of media services. Preferably, the communications are procedural calls and requests comprising computer commands, for example hypertext markup language (HTML) or extensible markup language (XML) based requests, transported as packets adhering to a transport structure (e.g., Transmission Control Protocol/Internet Protocol (TCP/IP)) through communications network 110. The procedural calls are formatted through the use of an application programming interface (API). This interface comprises a series of functions that are used by a program or device to initiate a specific action (for example, an Internet enabled device uses an audio API to control a soundcard for the playback of an audio based media service).

Playback device 202, as an Internet enable device, contains hardware and software (APIs and program subroutines) for communicating and interacting with content aggregator 102. Preferably, playback device 202 comprises central processing unit (CPU) 214, program memory 216, data memory 218, an audio speaker 220, display device 222, and input device 224. CPU 214 (a computer processor) processes audio services received from the content aggregator 102, received via communications network 110. CPU 214 is coupled to data memory 218 that stores data received from the content congregator 102 and selected media services. Program memory 216, connected to CPU 214, stores programming instructions and APIs used to communicate with and process the media services obtained from content aggregator 102.

Display device 222 displays the program genres and subgenres of audio based media services available from content aggregator 102. Preferably, display device 222 is a television display, LED display, or LCD display. The genres and subgenres are selected by using input device 224 by engaging a button, dial, or touch screen interface, or other tactile mechanism available on input device 224. CPU 204 requests (via a command such as a computer command or a procedural call) an audio based media service (in this example from a radio station 106) through content aggregator 102, after the media service was selected via input device 224. Content aggregator 102 receives the request from playback device 202 and, in response, sends the selected media service to playback device 202 in the form of a packetized transmission. Playback device 202 processes the media service and outputs the results through connected audio speaker (loudspeaker) 220. In an alternative embodiment, the selected media service is video based and is outputted to display device 222.

Set top box 204 is an Internet enabled device that receives audio and video based media services from, for example, cable or broadcast television stations. Preferably, set top box 204 is a conduit for media services that are multi-threaded or multiplexed by set top box 204 to devices that are not Internet enabled (e.g., stereo receiver 206 and television audio output 208). For example, set top box 204 receives a classical music based media service, which set top box 204 sends to stereo receiver 206. At the same time, set top box 204 receives a newscast media service that is transmitted to coupled television 208. Optionally, set top box 204 transmits audio services to an attached data network 210 (e.g., Ethernet network, wireless RF network, power line based network, or infrared network) that is connected to output device 212 (connector or audio speaker) that outputs the media services as a signal.

Multi-threading operates by set top box 204 dividing up its processing tasks (housekeeping tasks, data retrieval, processing data, outputting data) into a number of timeslots. Each processing task is allocated a number of timeslots. Processing tasks of a high priority (playback of a media service) receive a larger number of timeslots than other processing tasks (updating the display of available media services). The times slots as allocated in accordance with a predetermined procedure. In the current example, set top box 204 divides each second into ten timeslots: four timeslots are allocated for the classical music media service, four timeslots are for the newscast media service, and the remaining two timeslots are for housekeeping procedures. Set top box 204 then processes the media services and performs housekeeping tasks in accordance with the timeslots allocated. An embodiment of the invention supports that time slots durations may be unequal or equal amounts of time.

Figure 3:
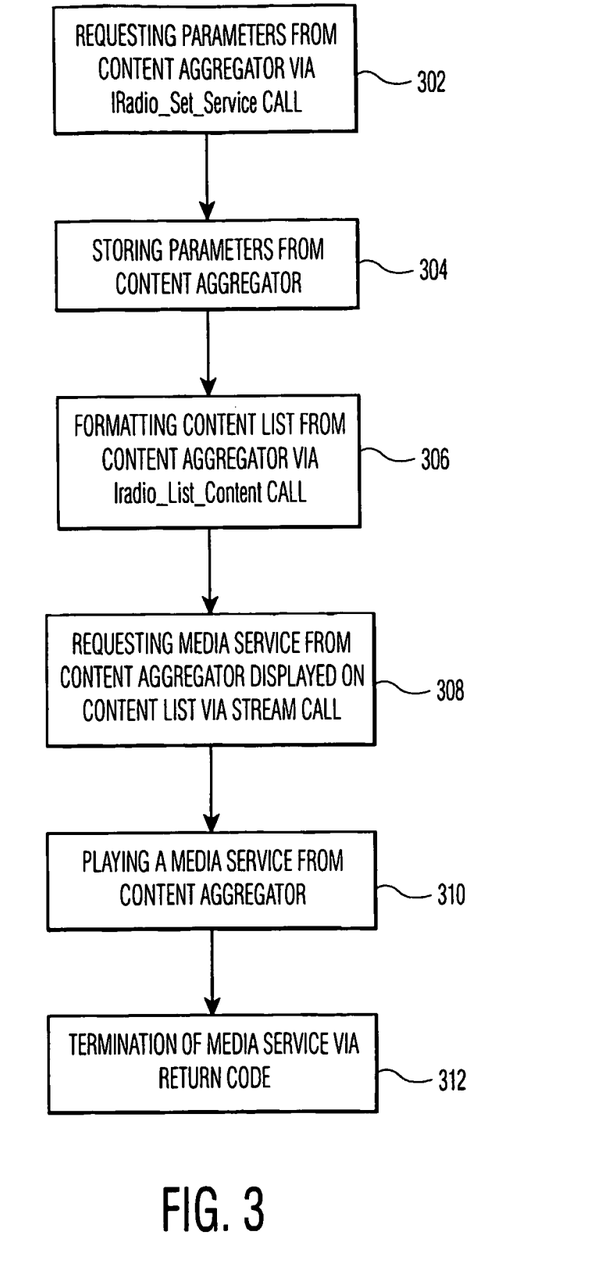
FIG. 3 is a flowchart of formatting a request to a content aggregator.

FIG. 3 shows a flowchart of a method of configuring a device (playback device 202 or set top box 204) to the same data format as content aggregator 102 for acquiring and outputting selected media services. In the preferred embodiment, playback device 202 communicates with a content aggregator 102 through communications network 110 in accordance with computer instructions controlling the CPU 214. The computer instructions comprising an API operating through specific procedural calls. The API requests parameters from content aggregator 102 via a Set_Service_Call in step 302. The parameters transmitted to playback d vice develop a data and communication structure used by playback device 202 to communicate with content aggregator 102. The communication structure is the format used to communicate data between playback device 202 and content aggregator 102. Preferably, the playback device 202 conforms with TCP/IP, Open Systems Interconnection (OSI) protocol, 3G, or WAP based transport protocols architectures. Accordingly, playback device 202 determines the communications structure of content aggregator 102 by using a handshake process and receiving data back that comports to a predetermined communications structure. Also, playback device 202 passively receives a data stream from content aggregator 102, whereby playback device 202 determines the communication structure based upon key attributes that exist in the data stream. For example, playback device 202 reads a header of a received data packet and determines that the data packet comports to a MPEG transport and data scheme.

For example, a sample data structure comprises media service menus, the locations (URIs) and types of media service formats (Real Audio, Microsoft Media Player, MP3) available from the providers of the media services that correspond to a style sheet Playback device 202 receives the style sheet from content aggregator 102 and formats incoming and outgoing data accordingly. Preferably, the determination of data structure comprises a document object model (DOM) comprising three levels. Level 1 establishes the format governing the exchange of data (e.g., XML and HMTL). Level 2 controls presentation and manipulation of data being transmitted (using style sheets). Level 3 defines a content model (e.g., data variables and metadata fields) and events used for a document (function key F12 saves a document). Optionally, Multipurpose Internet Mail Extensions (MIME) compliant classes and object types are used to define the objects available. Playback device 202 stores data structure parameters from content aggregator 102 into the program memory 216, in step 304, and formats future communications with the content aggregator 102 accordingly.

The use of a DOM allows playback device 202 to support new document types and media formats as multimedia standards adjust. For example, a new content aggregator uses a new multimedia player to play back available media services. Playback device 202, when requesting a media service from the new content aggregator, will read the corresponding DOM and locate the new multimedia player (either by a embedded locator in the DOM or by referring to an external database). Playback device 202 then requests a codec (update) for the new media player, which is stored once the codec is received. The media service is ready to be outputted by playback device 202 using the new media player.

With the data structure parameters stored, playback device 202 requests a content list of media services from content aggregator 102 via a List_Content_Call issued by CPU 214, in step 306. As displayed in FIG. 4, the List_Content_Call comprises an Iradio API 412 that initiates an Iradio Request API 402 (stored in program memory 216) that allocates and manages the internal resources used for the content list request. Preferably, CPU 214 designates operational cycles for the content list request and designates space in the data memory 218 for the storage of a content list. Optionally, Request API 402 manages multiple requests for content lists from a plurality of content aggregators 102, simultaneously.

Figure 4:
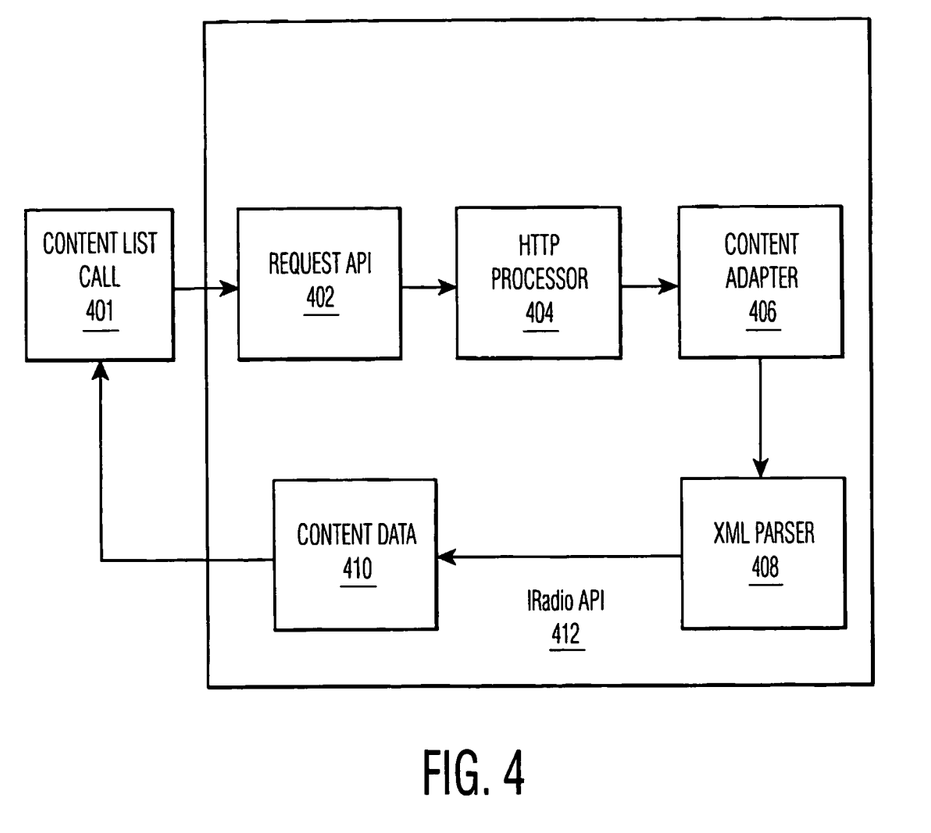
FIG. 4 is a block diagram of requesting a content list from a content aggregator.

CPU 214 then issues a HTTP processor API 404 subroutine that controlling the communication transmissions with content aggregator 102. HTTP processor API 404 functions in accordance with the parameters stored in step 302 by managing the connection, communications, and HTTP protocol exchange with the content aggregator 102. This includes all processing related to HTTP URI redirection, error recognition, and response classification as a standard response to a stream comprising a media service. HTTP processor API 404 transmits the content list request to content aggregator 102 via communications network 110. Content aggregator 102 responds by transmitting a content list of available media services received through HTTP processor API 404.

After receiving the content list, preferably in a pred termined format, CPU 214 initiates content adapter 406 routine that formats the received content list to an internal format of data and an internal data structure used by playback device 202. For example, CPU 214 uses a XML (internal format of data) based document type definition (DTD) that predefines the internal data structure (data fields) used for playback device 202. Data received from the content aggregator 102, in a XML format, is directly matched to the data fields defined by the DTD. If the data received from content aggregator 102 does not comply with the internal data format (XML), content adapter 406 formats the data into XML, preferably by the use of translation tables, and associates the formatted data into the internal data structure (DTD) of playback device 202. Optionally, the formatted data and data received from content aggregator 102 are stored in data memory 218. Also, the DTD is updateable (for example, an update sent as a style sheet via the Internet 110 overwrites an existing DTD).

XML parser 408 receives the XML based data from the content adapter 406 (or from the data memory 218), and maps the XML based data to preselected menu elements that are displayed and manipulated by a user. The data mapping accomplished via a data table that indicates which variables from the internal data structure are mapped to preselected menu elements.

Figure 9:
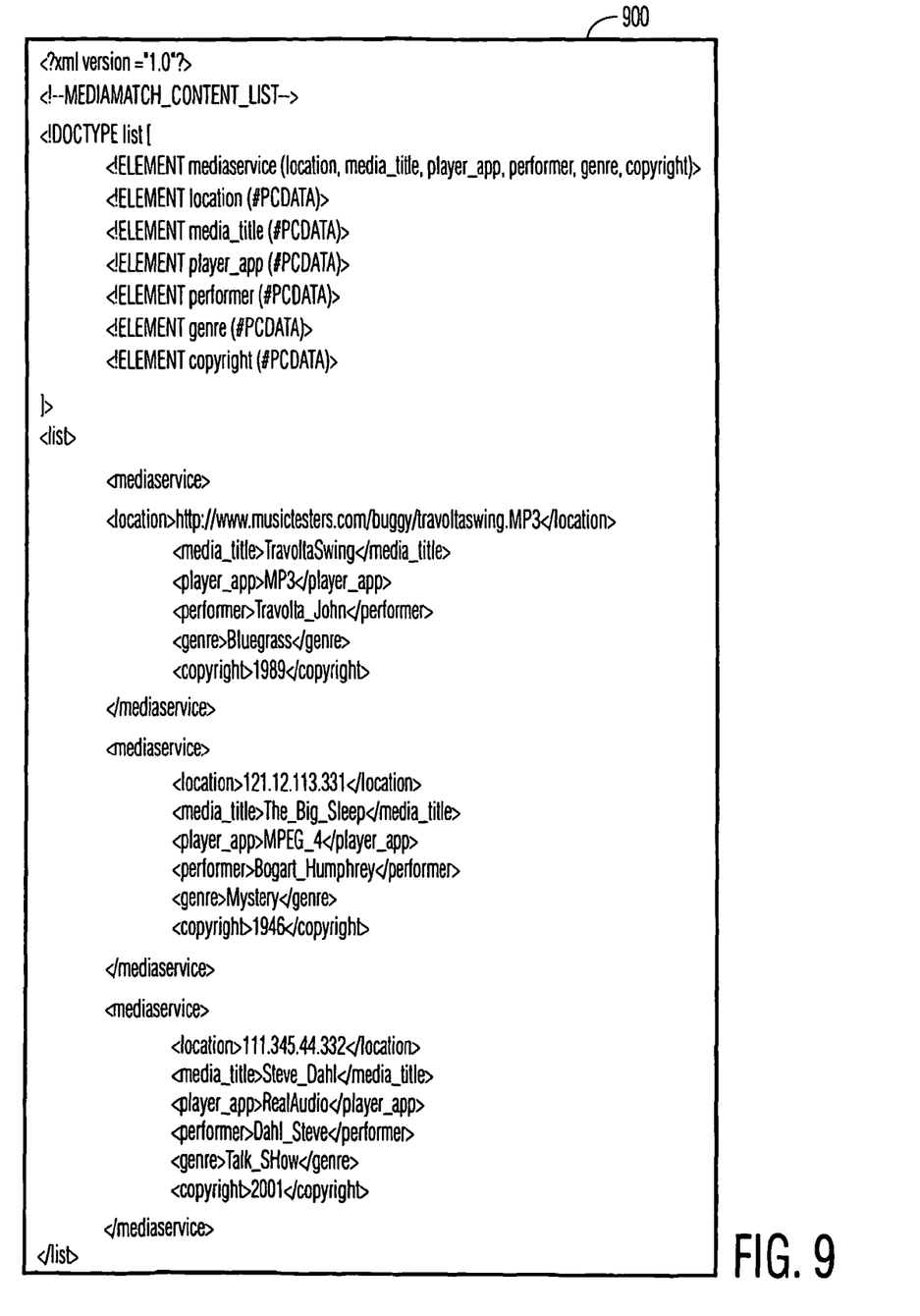
FIG. 9 is a diagram of a content list of media services a playback device receives from a content aggregator as computer code.
Figure 10:
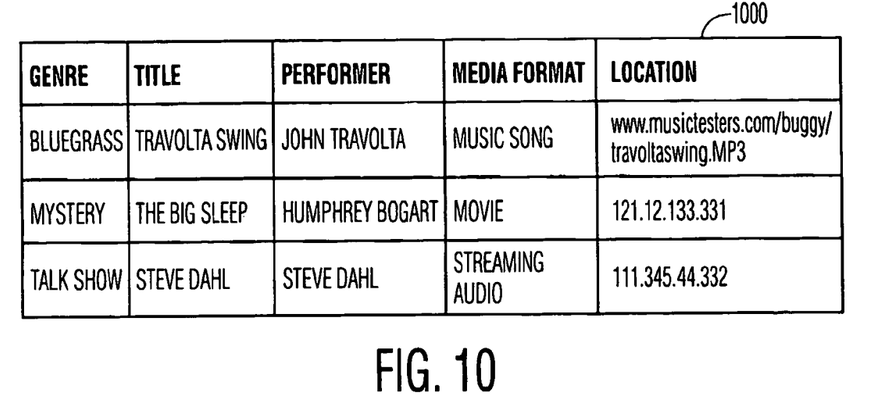
FIG. 10 is a diagram of a content list of media services formatted to the internal data structure of a playback device by a content adapter.
Figure 11:
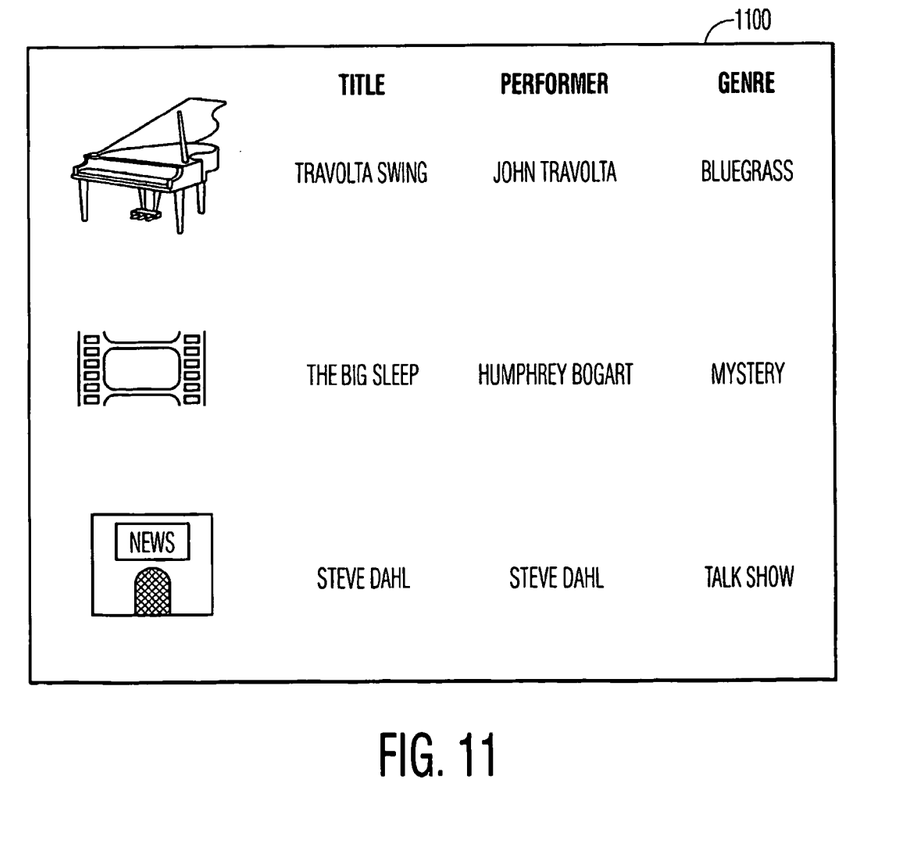
FIG. 11 is a display of a content list of media services formatted into a menu by a XML parser.

FIG. 9 is a diagram of a content list of media services 900 (in XML format) the playback device 202 receives from content aggregator 102. FIG. 10 is a display of a content list of media services 1000 formatted to the internal data structure of the playback device 202 by the content adapter 406. FIG. 11 is a display of a content list of media services 1100 formatted into a menu by the XML parser 408.

As an exemplary embodiment, data formatted by the XML parser 408, is displayed as a hierarchical menu on display device 222. The hierarchical menu lists fields that are either preselected or designated by a user (sample fields are media service, title, media type, performer, content aggregator source, etc.). For example, a "top" level of the menu is displayed by genre (e.g., talk show, music, news, sports talk, mystery, soap opera, etc.). When a user selects a genre listed on the "top" menu level via input device 224, content data procedure 410 initiated by CPU 214 checks data memory 218 if there are any sub-genres or available media services listed in association with the selected genre. Alternatively, content data procedure 410 issues an additional content list call 401 to content aggregator 102 for more information that is associated with the selected genre (repeating the steps discussed above). Content data procedure 410 generates and displays from the associated data a "second" level menu listed underneath the "top" level. The user then makes a selection from the "second" level, and content data procedure 410 continues to issue content list calls 401, until the user selects a media service for playback.

After a media service is selected via input device 224 (e.g., from a hierarchical menu or a listing of available media services), CPU 214 issues an Iradio_Stream_Contents_call API, in step 308, to retrieve the selected media service from the content aggregator 102. The Iradio_Stream_Contents_call API, as displayed in FIG. 6, begins with a Stream Request Call 602 that determines a location of the requested media service (preferably the media service's URI) either through data returned from the Iradio_List_Content_Call (in data memory 218) or through other means (e.g., as requesting the location of the media service from the content aggregator 102). Optionally, Iradio_Stream_Contents_call API 308 supports asynchronous (multiple) requests for media services via the multithreading capability described above.

Figure 6:
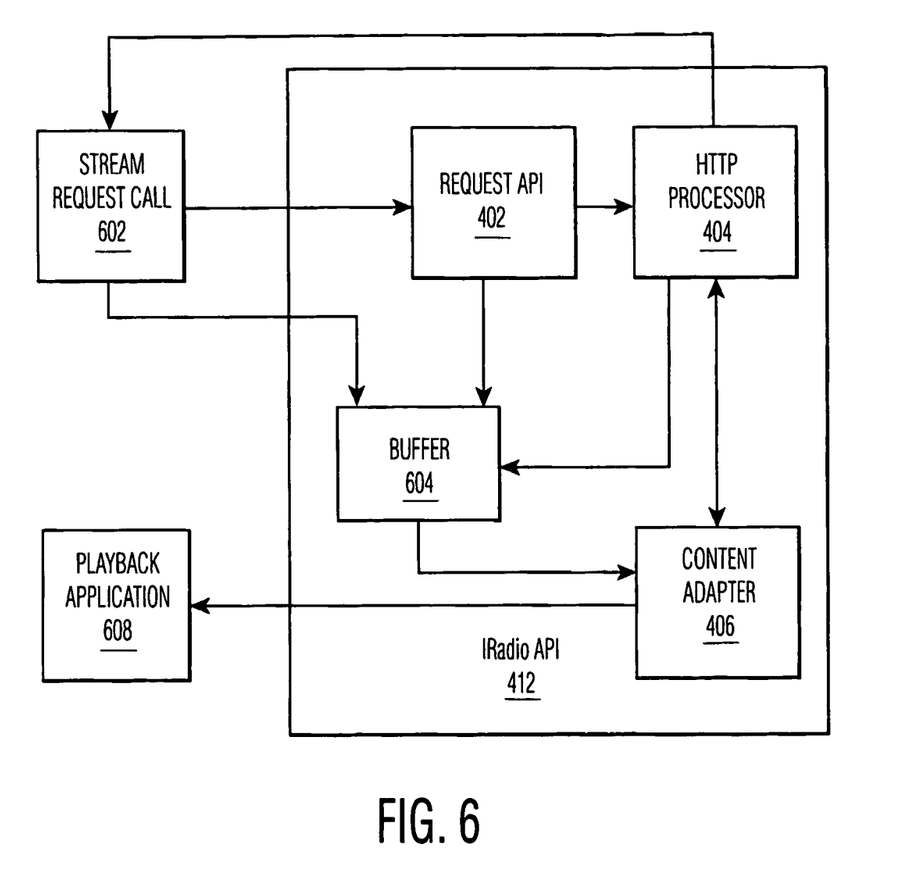
FIG. 6 is a block diagram of requesting and acquiring a media service from a content aggregator.

Once the location of the selected media service is known, the CPU 214 issues an Iradio API 412 that starts with the Request API 402 subroutine for allocating and managing resources used for the Stream Request Call 602. HTTP processor API 404 is issued, as part of Iradio API 412, to connect to the location of the selected media service via the communications network 110. The connection to the location of the media service is a direct connection (website, storage device, cellular network, etc.), a connection made through cont nt aggregator 102 to the location of the media service, or a connection that is redirected to the location of the media service. HTTP processor API 404 also manages the details of locating stream data in the response that comes from the requested media service's location. The request for a media service is preferably made as a HTTP or MIME compliant request containing information about the resources required to playback the media service (such as a media player). Along with standard HTTP redirect processing, HTTP processor API 404 analyzes the HTTP response header to determine whether the response is a stream, media file, or other type of multimedia format (e.g. a REALPLAYER® based stream, a non-streamed MP3 file, or a video signal). Once the determination is made, HTTP processor API 404 accepts data comprising the selected media service.

As the data comprising the media service is transmitted to playback device 202, HTTP processor 404 routes the data to buffer 604 (contained in data memory 218). Buffer 604 preferably outputs data in a first in first out (FIFO) scheme. Optionally, buffer 604 comprises a plurality of memory banks that queue data in accordance with a predetermined method (e.g., shared memory, memory interleaving, memory address cycling, etc.) enabling the request and delivery of multiple media services via the multithreading capability discussed above.

Content adapter 406 accesses and processes the data comprising the media service that is stored in buffer 604. Preferably, the processing of media service data depends upon information that is contained in the response header or footer of the media service data (e.g., indicating the format of the media service, the corresponding playback application 608, output requirements of the media service). Processing examples performed by the content adapter 406 include decompressing the data, analyzing metadata in the media service data (e.g., metadata that describes the media service), or applying preselected audio or video effects.

The media service data, once processed, is sent to player application 608 (media player) that outputs or "plays" media service data in, step 310. The player application is a media complaint decoder (e.g., REALPLAYER, MPEG-1 Layer-3, MICROSOFT MEDIA PLAYER, QUICKTIME, MPEG-4, DivX) that decodes the media service data into a decoded audio/video signal that is ready for output to a media device (e.g., audio speaker, video screen, audio/video receiver, transmission device).

Player application 608 will keep playing the media service until the content adapter 406 runs out of data received from buffer 604 (starting playback of another media service), or the media service is terminated via a return code in step 312, whereby the media service is told to stop transmitting. Preferably, the return code is issued from content adapter 406 to HTTP processor 404 that sends a "cancel" command to the location of media service via the communications network 110 to terminate the transmission of media service data. The return code results from sources including, as examples, a user issuing a cancel command, an overflow/underflow error, not enough available memory, network congestion, output device not connected, etc. Optionally, CPU 214 has diagnostic circuitry that recognizes an error that results in the cancellation of the transmission of a media service via a return code.

As described above, an embodiment of the invention breaks up the processing demands of service requests, I/O (Input and Output) routines, and data conversion into distinct threads. The threads are dynamically categorized and allocated computer resources (by a predetermined method), in order to fulfill desired requests and housekeeping routines for the invention. The benefit of this approach is that requests can be processed by a system in accordance with this invention simultaneously, without the conflicts or delays induced by the processing of other requests.

In addition, the use of threads to process API requests allows application designers to choose whether or not they want to use synchronous or asynchronous interfaces to implement API services. This feature provides for APIs to be implemented within a vast majority of programs without forcing application designers to develop infrastructure around the API for managing its service characteristics.

The threads communicate with each other via a unique memory buffer queue that resides in data memory 218. The threads put and retrieve buffers (in data memory 218) from named queues, and when done with a buffer, release the buffer to a buffer pool comprising a plurality of buffers. The buffer queue enables the invention to designate specific threads to specific buffers, optimizing the storage and access of media service data when processing multiple media services.

Access to the memory buffer queue's data structure is protected by semaphore primitives, which may be implemented as a binary flag. The use of semaphore primitives allow for the media service data to be shared across threads without corruption of the data management structures. For example, when a thread requests a buffer from the memory buffer queue, all management of data structures that track the queue buffer are performed after locking a semaphore primitive that guarantees exclusive access to the data structures.

Queue retrievals of data from the memory buffers (in data storage 218), supports both a blocking and a non-blocking mode. In the blocking mode, the thread will stop processing and wait on the buffer to be presented, which could be an indeterminate amount of time. This blocking mechanism allows CPU 214 resources to be balanced across the threads. For example, the content adapter will process a buffer and send the buffer to the player application via a queue that empties the buffer. When the buffer is waiting to be filled, the content adapter will ignore (block) the buffer until it is filled by the I/O thread, freeing up the content adapter to access other filled buffers. The non-blocking mode accesses a memory buffer whether it is filled or empty (reducing the content adapter's efficiency).

As described in step 310, the invention optionally operates in a synchronous or asynchronous mode. Preferably, in accordance with the principles of the present invention, the asynchronous mode operates with callback functions, whereby the CPU 214 initiates a process (API) and designates the process to a specific thread. CPU 214 also designates a corresponding callback function for the procedure that terminates the procedure (API) when the callback function is returned to CPU 214. For example, when an Iradio_List_Content_Call 306 (requesting a list of media services) is initiated by CPU 214, a thread and a callback function are issued by CPU 214 that corresponds to the procedure. As the thread corresponding to the procedure is executed, the callback function is passed to a pointer that responds to a predetermined condition specified for the procedure (e.g., the transmission of the content list from content aggregator 102 triggers the callback function back to CPU 214). During this time, additional procedures run on other threads. The pointer, after the condition is met, issues a callback function to CPU 214 that terminates the thread executing the procedure.

Alternatively, the synchronous usage model does not utilize callback functions. The functionality is the same of the asynchronous mode, but only a single (current) procedure is run at a time, effectively blocking all other procedures until the current procedure is serviced or an error results (terminating the current procedure). CPU 214 begins a "new" procedure after the current procedure terminates and memory space in data memory 218 is cleared with a release command (ReleaseRespond).

Figure 7:
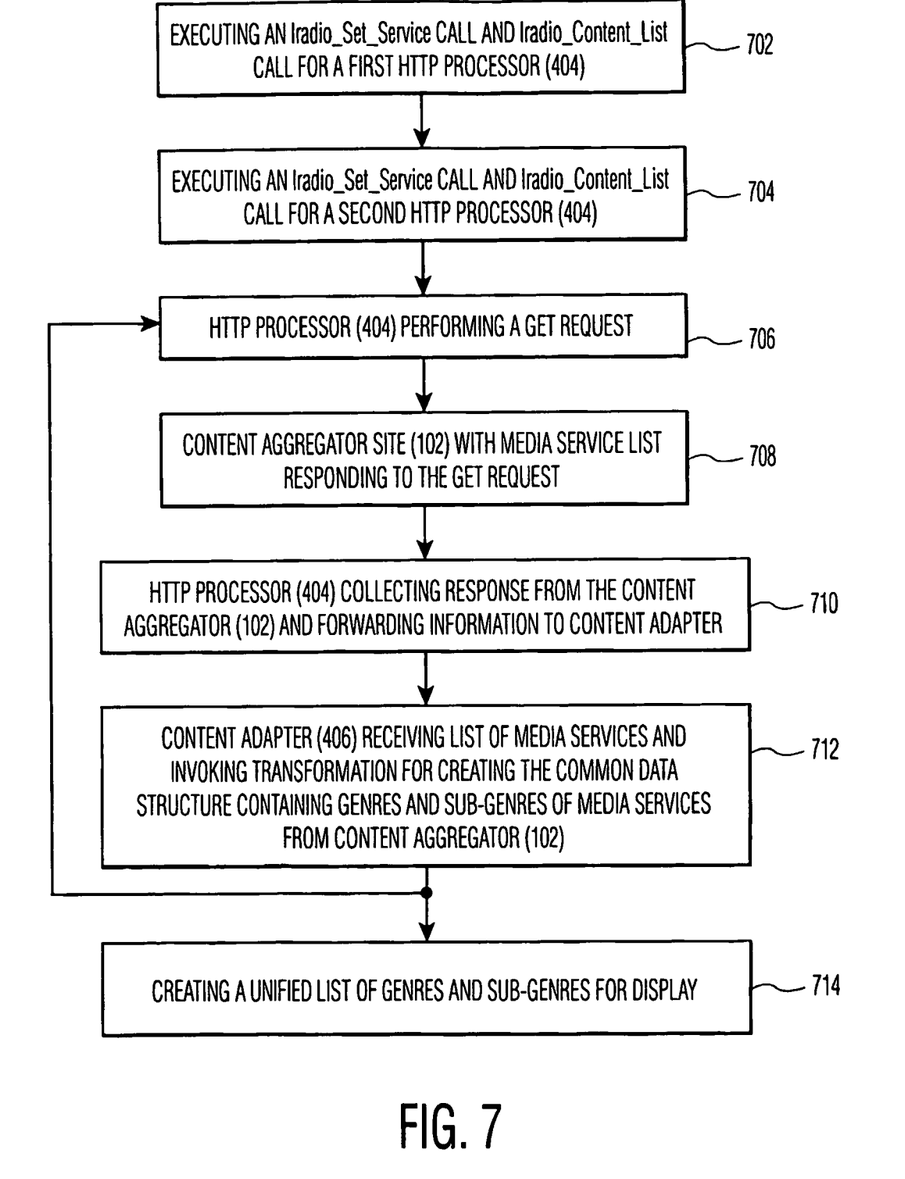
FIG. 7 is a flowchart of a synchronous usage model requesting and acquiring music services from a content aggregator

FIG. 7 displays an embodiment of the invention for combining the list of media services available from two content aggregators 102. Step 702 begins with a request for a list of media services by CPU 214 to a first media content aggregator. CPU 214 executes an Iradio_Set_Service call that builds a set of commands used to access first content aggregator 102 (in accordance with FIGS. 3 and 4 described above). A follow-up Iradio_Content_List call is assigned to a thread for processing, freeing CPU 214 for other processing tasks. First HTTP processor API 404 receives the thread and initiates the retrieval of the list of media services from first media content aggregator 102.

Step 704 entails a request for a second list of media service available from a second media content aggregator 102. CPU 214 executes a second Iradio_Set_Service call that builds a set of commands for accessing second content aggregator 102 (in accordance with FIGS. 3 and 4 described above). An Iradio_Content_List call is then assigned to a second thread, which is received by second HTTP processor API 404 that accesses and retrieves the list of media services from second content aggregator 104. Optionally, the first and second HTTP processor API 404 are the combined into one HTTP processor unit 404, which may be contained within CPU 214.

In Step 706, the first HTTP processor API 404 performs a Get command (e.g., HTTP Get Command) used to request the list of media services from first content aggregator 102. Preferably, the Get command is transmitted as a HTML or XML based request.

Step 708 involves the response to the Get command by first content aggregator 102. Preferably, first content aggregator 102 transmits a list of media service to first HTTP processor API 404 that determines the integrity of the list (e.g., does the list comply with a format recognized by first HTTP processor API 404?). Alternatively, if the list of media services is corrupted, the Get command (in step 706) is repeated a predetermined number of times, before first HTTP processor API 404 times out and returns an error message to CPU 214. In Step 710, first HTTP processor API 404 collects data comprising the list of media services from first content aggregator and forwards the list to content adapter 406 for additional processing.

Step 712, content adapter 406 receives the list of media services and invokes the appropriate transformation routine (e.g., converting the received list into the internal format of the invention via lookup tables) to create a common (internal) content list data structure containing genres and sub-genres of media services. This common content list may be used to generate a viewable list of media service that is displayed on display device 222. Preferably, the genres and sub-genres of media services are determined by metadata within the list of media services, or by matching the metadata to an external database (e.g., CDDBT™ and MUZEW™). In accordance with the principles of the present invention, media services may be grouped by information (metadata) such as: media service author, date of copyright, media service date of transmission, performer, title, subject, parental rating, user rating, director, producer, running length, media service transmission locator (e.g., radio station, television station, studio, etc), content aggregator subscription, and language.

In Step 714, CPU 214 repeats steps 706-712 for a second list of media services available from second content aggregator 102. A second HTTP processor API 404 requests the second list of media services via a Get Command (step 706). The second content aggregator 102 responds to the Get command (step 708). The second HTTP processor API 404 collects the list of media services from second content aggregator 102 and forwards the second list to content adapter 406 for additional processing (step 710). Content adapter 406 uses the common list data structure to match the media services listed in the second content list to genres and sub-genres of media types. The contents of the first and second content list are then indexed into a unified content list, for example under common music genres as shown in FIG. 5 or other types of hierarchical listings using metadata attributes, as described above.

The unified content list is presented to the user on display device 222. Each item in the unified content list has a content identifier that uniquely identifies the content and its source. Content adapter 406 passes this identifier to CPU 214 when a media service is selected for retrieval. CPU 214 then retrieves and plays back the media service, in accordance with the method described in FIG. 6 above.

Figure 5:
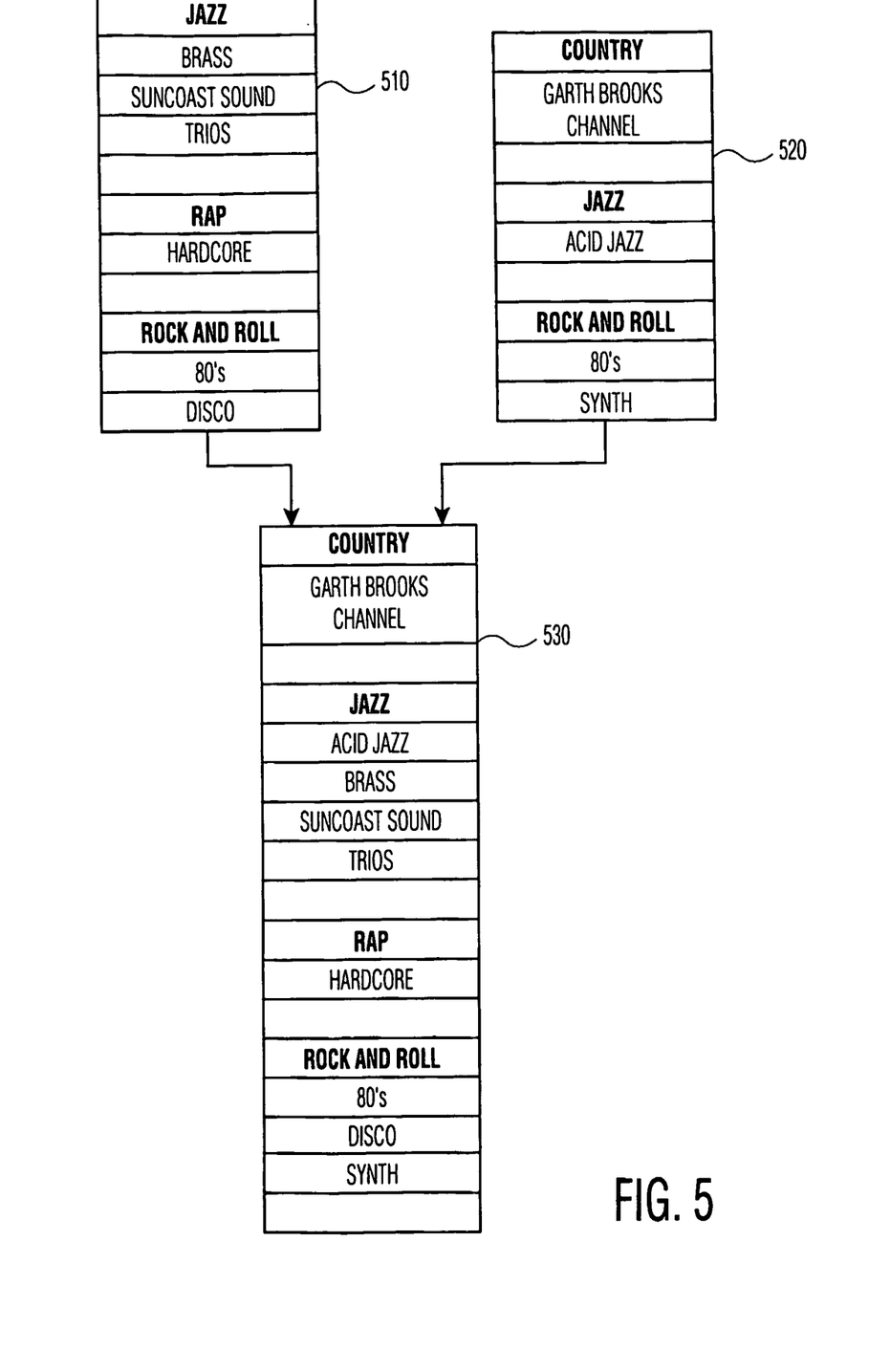
FIG. 5 is a diagram of audio based media services available from a plurality of content aggregators indexed into a unified content list.

An example of merged content selections in the form of a unified list is displayed in FIG. 5. The genres and the sub-genres of media services available from the content aggregators are downloaded into data memory 218, and are manipulated preferably by a subroutine of the XML parser 408. For example, a first content aggregator 102 has a listing of media services 510 grouped by music genres and related sub-genres (e.g., Jazz, a music genre, has the sub-genres of Brass, Suncoast Sound, and Trios). Second content aggregator 102 has a listing of media services 520 grouped by music genres with related sub-genres (e.g., Jazz, a music genre, with the sub-genre of Acid Jazz). XML parser 408 groups the related genres together and into a format shown in unified content aggregator list 530 (e.g., Jazz has the combined sub-genres from the two content aggregators being Acid Jazz, Brass, Suncoast Sound, and Trios). This format is then outputted to display device 222, and the music services are selected via input device 224 for playback through audio speaker 220.

Figure 8:
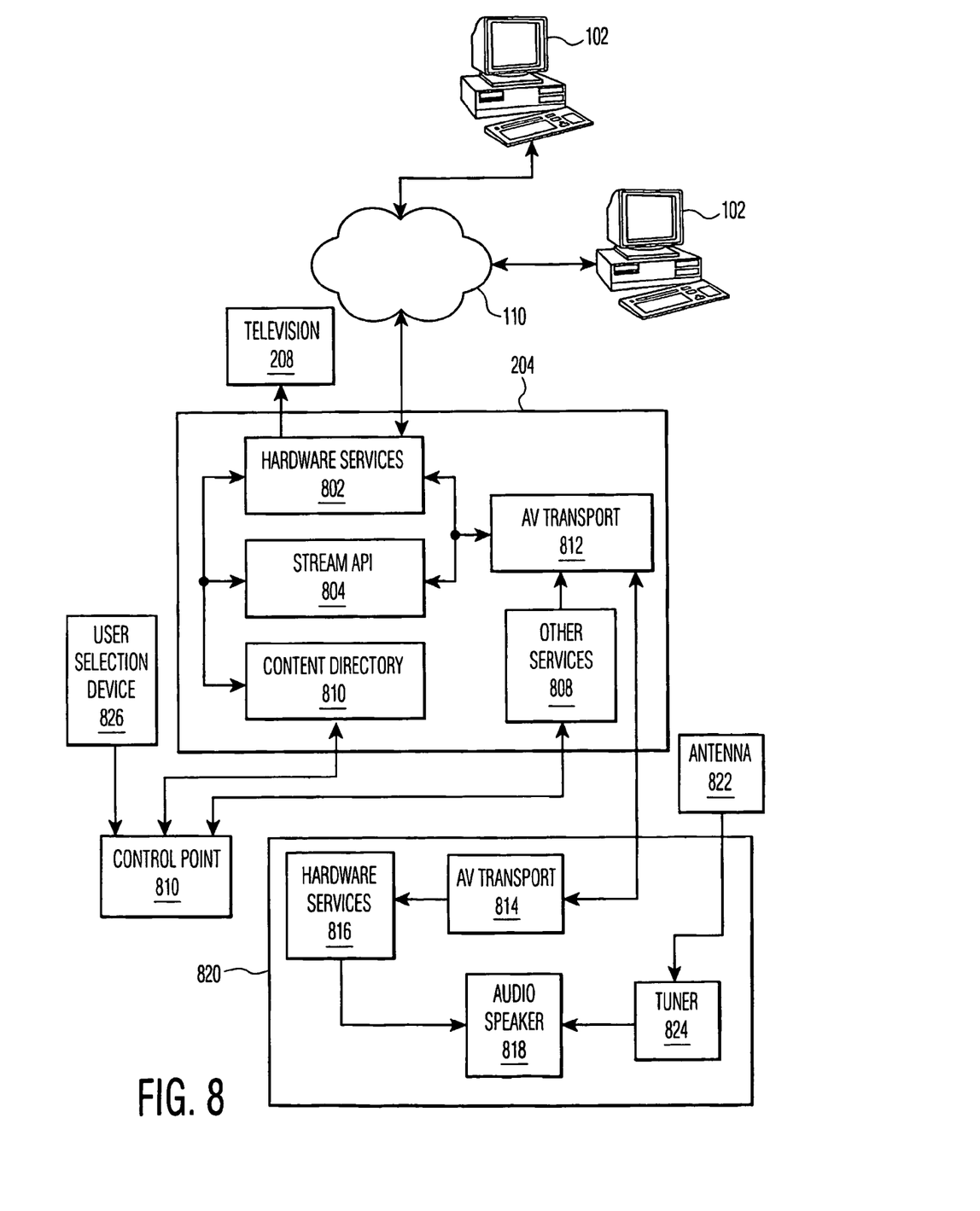
FIG. 8 is a diagram of requesting and acquiring music services from a plurality of content aggregators by using a control point.

FIG. 8 describes an exemplary embodiment of the invention that allows for a device connected on a network to control and receive secondary media services available through content aggregator 102. The device connected to the network conforms to a predetermined protocol (e.g., Universal Plug and Play, IEEE 802.11, BLUETOOTH®, IEEE-1394) permitting the device to recognize and utilize features of other equipment on the network that conform to the predetermined protocol. A primary media service is a media service that natively exists in a device, for example external device 820 (a stereo receiver) plays audio received as radio waves received through antenna 822 that are demodulated by tuner 824 for playback through audio speaker 818. A secondary media service is a media service that originates in other equipment that is accessed and controlled through a network connection by a device on the network; for example receiver 820 receives and controls a streaming audio broadcast (secondary media service) from content aggregator 102 through cable set top box 204. In this example, the set top box 204 offers the secondary media services as ContentDirectory 806 services (hardware or software that lists the available media services) that are indexed and managed through the operation of the predetermined protocol.

Receiver 820 communicates via the predetermined protocol to set top box 204 through a network or wireless connection. Set top box 204 also connects to content aggregator 102 through communications network 110, whereby content aggregator 102 has secondary media services (e.g., streaming audio and video, MP3, compact disc music, broadcast video) available. Preferably, content aggregator 102 communicates to set top box 204 through a TCP/IP based connection through hardware services module 802. Hardware services module 802 is a modem or other type of bidirectional communications device with serial, parallel, Ethernet, or other connecting interface. Hardware services module 802 also controls the video programming displayed on television 208 connected to set top box 204.

Control point 810, a controller (e.g., computer, microprocessor, or software driver) connected to set top box 204, requests a listing of media services available from content aggregator 102 through set top box 204. This request is received by ContentDirectory 806 that in turn issues a List_Content_Call (from step 306) to the stream API 804, as described above in FIG. 4. Optionally, set top box 204 receives listings of media services from a plurality of content aggregators 102 preferably as XML or HTML based documents. The listing of the media services received by stream API 804 is processed and transferred to the ContentDirectory services 806. Additionally, the ContentDirectory service 806 formats the listing of media services from XML in accordance with a predetermined format and indexes the listing for access by other equipment that conform to the predetermined format.

Control point 810 transmits a command to set top box 204 to display the available media services on a display device (television 208). The control point 810 uses the display services routines of the predetermined protocol and requests the list of media services from set top box 204. Also, set top box 204 takes delivery of the request and transfers the listing of media services residing in the ContentDirectory services 806. Control point 810 receives and formats the media service list as HTML code that is sent to hardware services 802 that renders the HTML for display on connected television 208. Preferably, the rendered HTML code is displayed as a combination of text and graphics that may be used as an electronic programming guide, as in FIG. 11 described above. Control point 810 is also enabled to control and transmit other services 808 such as additional media services, or Internet based material that does not come from content aggregator 102, such as an electronic program guide, electronic mail, and purchasing a selected media service (as a CD or cassette tape) through an online store via user selection device 826.

From television 208, a media service is selected from the listing of media services via user selection device 826 that transmits signals to control point 810. Preferably, user selection device 826 is remote control that uses a wire or wireless interface to communicate with control point 810, whereby television 208 displays the listing of the media services by a use of a directional pad, buttons, or knob on user selection device 826. Once a media service is selected with user selection device 826, control point 810 formats and sends a request for the media service to a content aggregator 102 via hardware services module 802 and communications network 110.

Content aggregator 102 receives the request for the media service and after processing the request, transmits data comprising the media service to hardware services 802 through communications network 110. Hardware services 802 receives data that transferred to stream API 804 that formats the data of the media service to an internal format utilized by set top box 204.

Control point 810 coordinates the outputting of the data comprising the media service by transmitting a request to AV transport 812 to output the media service to receiver 820. Preferably, AV transport 812 comprises a connection interface to an external device (as receiver 820). Optionally, AV transport 812 comprises software that controls the transmission of data (forming the media service) residing in buffers of the stream API 804. AV transport 812 receives (from the stream API 804) and formats the data comprising the media service (into predetermined signal format for output to the receiver 820. The signal is outputted through the connection of the AV transport 812 to receiver 820. AV transport 812 continuously queues the buffers of stream API 804 until the media selection is completely received or a user terminates the play of the selection.

Receiver 820 (e.g., an audio receiver) receives the output signal through AV transport 814 via the connection interface with set top box 204. AV transport 814 forwards the signal to hardware services 816 for processing. Hardware services 816 then transfers the processed signal to audio speaker 818 for audio playback. Optionally, the external device has built in tuner 824 that receives RF based radio signals from antenna 822. Tuner 824 demodulates and decodes radio signals for playback on the connected audio speaker 818. The external device automatically interrupts the playback of tuner 824 when hardware services 816 receives and outputs the processed signal. The playback of the radio signals received through tuner 824 is resumed when the selected media service is terminated or completed.

In accordance with the principles of the present invention, forms of other delivery systems delivering media services available from content aggregators may benefit from the present invention. For example, a satellite radio broadcast with multiple media services available may have its selections combined with the available media services through a set top box cable interface, to form a unified listing of media services.

The invention claimed is:

1. A method of processing media services, as performed by a playback device with a processor, from a plurality of content aggregators through a communications network comprising the steps of:
   said playback device receiving a first media service list from a first content aggregator from a plurality of content aggregators,
   said playback device receiving a second media service list from a second content aggregator from said plurality of content aggregators, wherein said second media service list has a data structure incompatible with a data structure said first media service list;
   said playback device translating said first media service list and said second service list into a unified media service list comprising media services wherein said unified media service list is the same data structure of at least one of: said first media service list, and said second media service list; and
   said playback device downloads a first codec to play a first media service present on said unified media service, in response to a user selection of said first media service, when said first media service is in a format that requires said first codec for playback.

2. The method of claim 1 further comprising an additional step of displaying said unified media service list.

3. The method of claim 2 further comprising additional steps of:
   requesting a media service displayed on said unified media service list, wherein a location of said media service is identified by a corresponding uniform resource locator from said plurality of uniform resource locators;
   receiving said media service; and
   outputting said media service.

4. The method of claim 3, wherein
   said media service is output from a device comprising at least one of: a portable audio device, a stereo, an Internet radio, a computer, a telephone, an Internet enabled device and a memory device.

5. The method of claim 3, wherein
   said output comprises a function selected from at least one of: playing, copying, and transmitting said media service to a playback device.

6. The method of claim 3, wherein
   said media service is in a format comprising at least one type of media extension from the group of: .ram, .rm, .rpm, .mov, .qif, .wma, .cmr, .avi, .swf, .swl, .mpg, .mpa, .mp1, .mp2, .mp3, .m3a, and .m3u.

7. The method of claim 1, wherein
   the data structure of said first content aggregator is defined by a document type definition (DTD).

8. The method of claim 1, wherein
   said plurality of content aggregator comprises at least one of a website, a server, a web-enabled device, a radio, a data storage device, an on-demand subscription service, tuning service, peer to peer media service, and a broadcast service.

9. The method of claim 1, wherein a third media service list is translated and merged in said unified media service list.

10. The method of claim 2 wherein
    said unified media service list is organized by at least one of: a genre of said media service, a media service author, a copyright data, a media service date of transmission, a performer, a title, a subject, a parental rating, a user rating, a director, a producer, a running length of said media service, and a language.

11. The method of claim 3, wherein
    said media service is from a content aggregator from said plurality of content aggregators.

12. The method of claim 3, wherein
    said media service is received from a location associated with a content aggregator from said plurality of content aggregators.

13. The method of claim 2, wherein
    said first media service list is associated with an first XML data format and said second media service list is associated with a different XML data format, such that the unified media service list will convert both the first XML data format and said different XML data format into an XML format compatible with said unified media service list.

14. The method of claim 2, wherein
    said unified media service list is formatted by using metadata from said unified media service list and checking such metadata by use of an external database and
    said first and second content aggregators are accessed via the same external communication network using a same interface.

15. The method of claim 10 where an external database is queried to provide metadata supporting said grouping operation where metadata from said media services are matched to said metadata from said external database.

* * * * *